United States Patent [19]
Haga et al.

[11] Patent Number: 5,211,563
[45] Date of Patent: May 18, 1993

[54] COMPUTER ASSISTED LEARNING SUPPORT SYSTEM AND PROCESSING METHOD THEREFOR

[75] Inventors: Hirohide Haga, Kyoto; Hiroyuki Kojima, Nishinomiya; Takaaki Yamada, Osaka, all of Japan

[73] Assignee: Hitachi, Ltd., Tokyo, Japan

[21] Appl. No.: 905,548

[22] Filed: Jun. 25, 1992

[30] Foreign Application Priority Data

Jul. 3, 1991 [JP] Japan .................................. 3-162622

[51] Int. Cl.⁵ .............................................. G09B 3/00
[52] U.S. Cl. .................................................... 434/322
[58] Field of Search ......................... 434/322-324, 434/336, 350, 352, 362, 327, 433; 364/419

[56] References Cited

U.S. PATENT DOCUMENTS

| | | | |
|---|---|---|---|
| 4,652,240 | 3/1987 | Wackym | 434/350 X |
| 4,877,408 | 10/1989 | Hartsfield | 434/350 |
| 5,002,491 | 3/1991 | Abrahamson et al. | 434/322 |

OTHER PUBLICATIONS

Watanabe, et al. CAI Handbook, Fuji Techno-System, 1989, pp. 212-223 and 446-460. (Japanese)

*Primary Examiner*—Stephen R. Crow
*Assistant Examiner*—Glenn E. Richman
*Attorney, Agent, or Firm*—Fay, Sharpe, Beall, Fagan, Minnich & McKee

[57] ABSTRACT

A computer assisted learning support system includes a storage for storing therein blocks of the teaching material respectively assigned with teaching material identifiers, the blocks being attained by subdividing the teaching material according to contents thereof, and link information which represents by a pair of identifiers of a teaching material a relationship between blocks of the teaching material, a display for presenting, in a changeover manner, a screen image of the blocks of the teaching material and a screen image of the contents of the blocks of the teaching material and the link information of the blocks, an input device for inputting therefrom a selection item for one of the displayed blocks of the teaching material items in response to the display thereof and a selection item for one of the link information items in response to the presentation of the contents of the blocks and the link information, a unit responsive to the selection for the block of the teaching material for displaying the contents of the selected block and the link information thereof, and a unit responsive to the selection for the link information for displaying in accordance with the selected link information the contents of a different block of the teaching material and link information of the different block.

13 Claims, 19 Drawing Sheets

FIG. 4 link pointer example poi_1.c SRC
 401   402    403     404    405

401 IDENTIFIER OF LINK INFORMATION
402 IDENTIFIER OF BLOCK OF THE TEACHING MATERIAL AS LINK SOURCE
403 LINK NAME
404 IDENTIFIER OF BLOCK OF THE TEACHING MATERIAL AS LINK DESTINATION
405 IDENTIFIER OF TYPE OF BLOCK OF THE TEACHING MATERIAL AS LINK DESTINATION

FIG. 5

502          504              506              508
 sdo  pointer  TEXT  10  15   20, 15           func poi  TEXT
 501           503           505              507

501······IDENTIFIER OF PART OF BLOCK OF THE TEACHING MATERIAL
502······IDENTIFIER OF BLOCK OF THE TEACHING MATERIAL
503······IDENTIFIER OF TYPE OF PART OF BLOCK OF THE TEACHING MATERIAL
504······START POSITION OF PART OF BLOCK OF THE TEACHING MATERIAL
505······END POSITION OF PART OF BLOCK OF THE TEACHING MATERIAL
506······LINK NAME
507······IDENTIFIER OF BLOCK OF THE TEACHING MATERIAL AS LINK DESTINATION
508······IDENTIFIER OF TYPE OF BLOCK OF THE TEACHING MATERIAL AS LINK DESTINATION

FIG. 17

| INDEX WORD | NORMAL WORD | MEANING CODE |
|---|---|---|
| JAPANESE LANGUAGE PROCESSING | PROCESSING OF JAPANESE LANGUAGE INFORMATION | kw |
| ⋮ | ⋮ | ⋮ |
| YATTA (DONE) | EXECUTION | n_kw |

| NODE NUMBER | PARA-GRAPH | NORMAL WORD | CODE OF MEANING OR PART OF SPEECH |
|---|---|---|---|
| 1 | ○○○○ | ◎◎◎◎ | ▲▲▲ |
| ⋮ | ⋮ | ⋮ | ⋮ |
| n | ○○○○ | ◎◎◎◎ | |

1501  1502  1503  1504

| USER'S NAME | PASSWORD | ALREADY-STUDIED TEACHING MATERIAL | NAME OF ALREADY-STUDIED TEACHING MATERIAL |
|---|---|---|---|
|  |  |  |  |
|  |  |  |  |

2101  2102  2103  2104

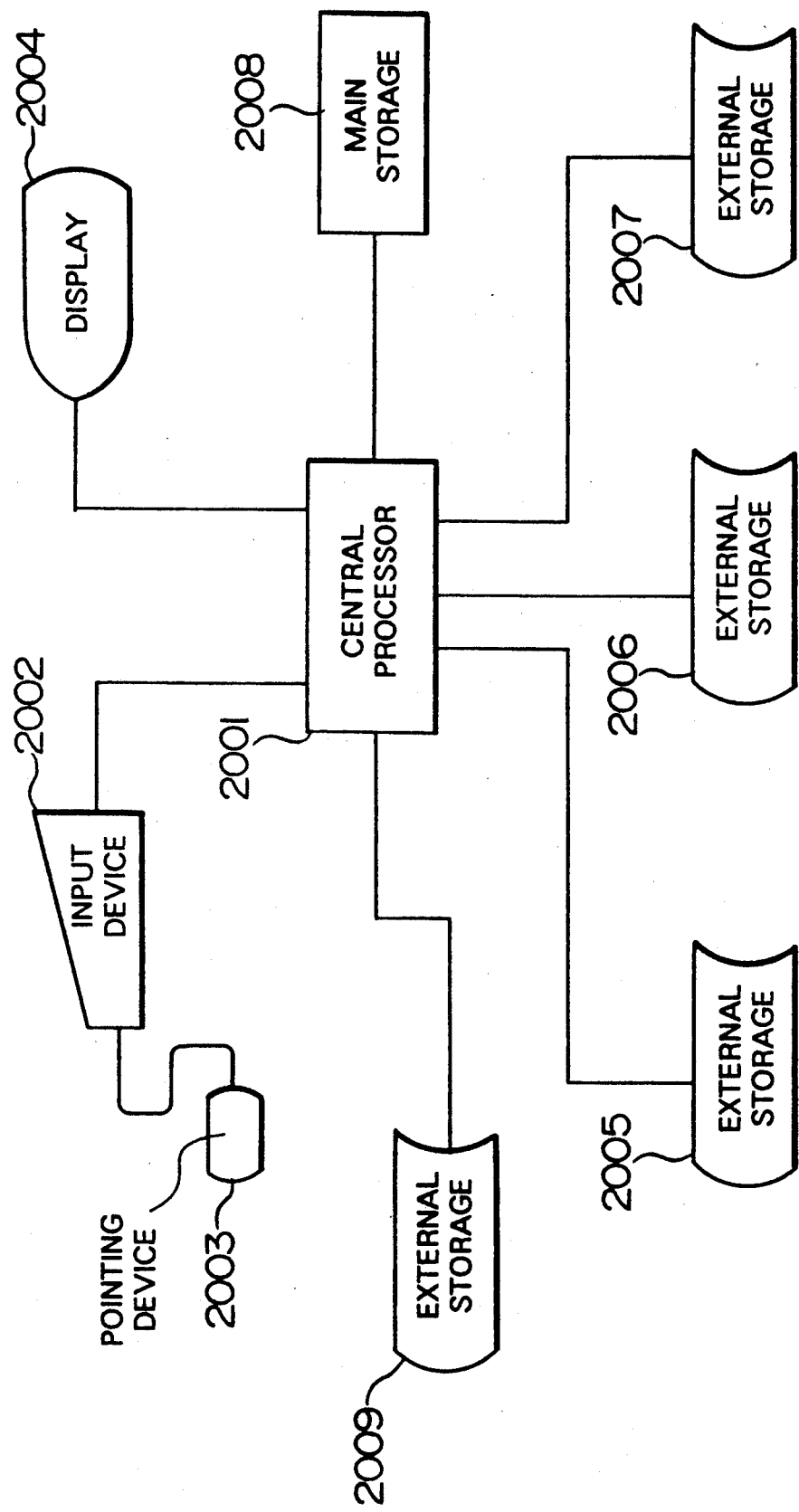

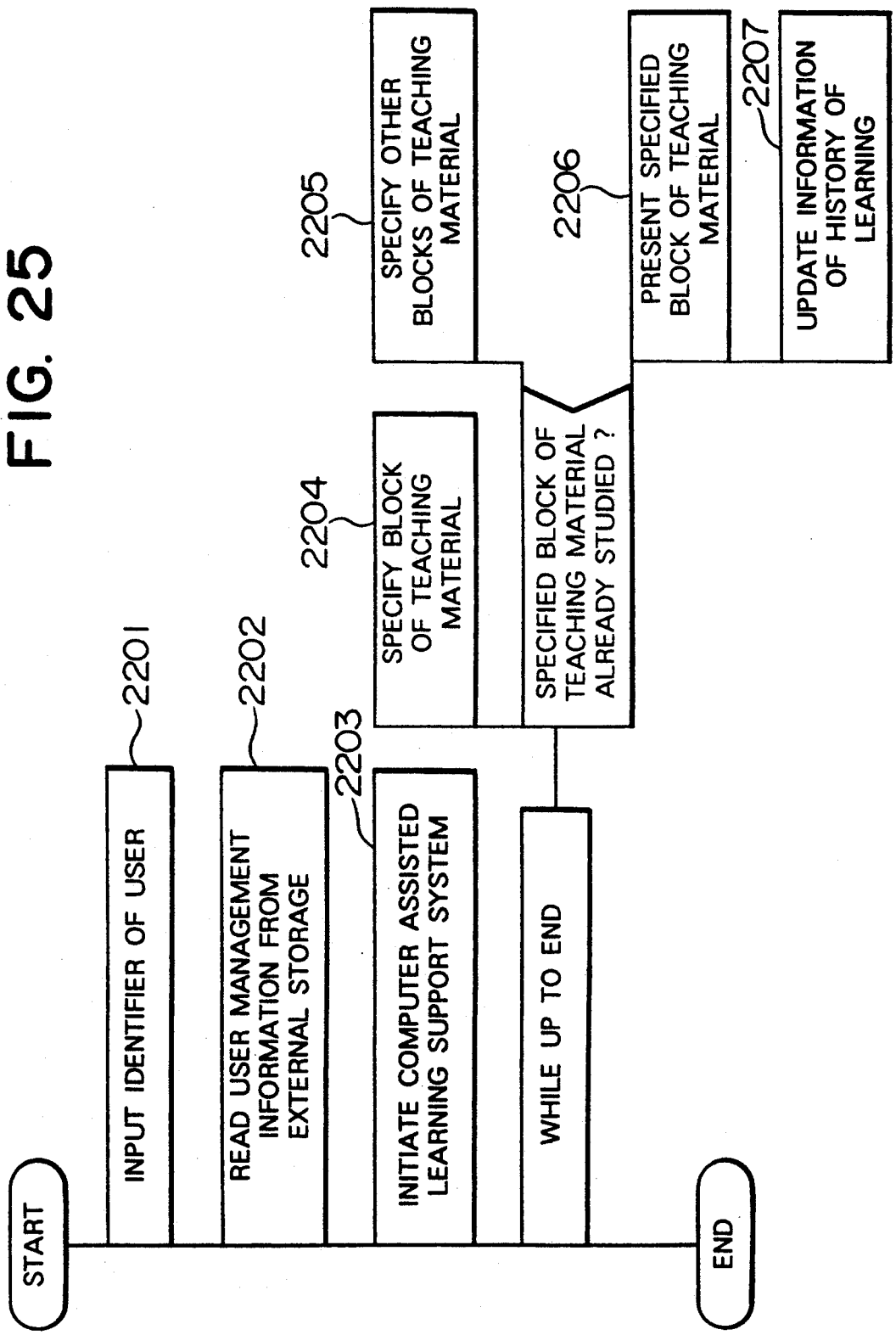

COMPUTER ASSISTED LEARNING SUPPORT SYSTEM AND PROCESSING METHOD THEREFOR

BACKGROUND OF THE INVENTION

1. Field of the Invention

The present invention relates to a computer assisted learning support system and a method therefor in which status of the progress of each learner is individually acquired via a computer, thereby improving the efficiency of education for the learner.

2. Description of the Related Art

There has been conventionally implemented education systems employing computers. The computer aided instruction systems (CAI) of the related art are roughly classified into three configuration types, namely, (a) center system, (b) network system, and (c) stand-alone system.

(a) According to the center system, various teaching materials and user information such as history of the learning and results attained by learners are stored in a memory of a host computer The user learns from the teaching materials via a terminal, a personal computer, a workstation, or the like connected to the host computer.

(b) The network system achieves operations via a computer network. Such a computer network includes or does not include a host computer as its center depending on cases. Even when a host computer is used, unlike in the center system, data of the teaching materials and the like are not arranged in a centralized manner in the host computer. Namely, the data items are respectively controlled by each computer connected to the network. The host computer is used only for such operations as management of users, management of history of the learning, and upgrading of teaching materials.

(c) In accordance with the stand-alone system, all operations of the processing including the management of teaching materials, management of history of the learning of the users, etc. are processed by only one computer.

The system configurations of these computer aided instruction systems have been described, for example, in pages 446 to 460 of the "CAI Handbook" written by Watanabe and Sakamoto (Fuji Techno-system, 1989). Moreover, a frame-type system using frames has been described in pages 212 to 223 of this article.

SUMMARY OF THE INVENTION

It is therefore an object of the present invention to provide a computer assisted learning support system and a method therefor capable of easily presenting to a user thereof necessary information suitably related to the status of the learning of the user.

Another object of the present invention is to provide a computer assisted learning support system and a method therefor in which even when a teacher and a student, who are users of the system, are physically far away from each other, the teacher and the student can operate items displayed on screens to exert influences onto each other so that the teacher supplies satisfactory instructions to the student and acquires detailed information about the status of the progress of the student.

These objects are established according to the following problem recognition on the conventional computer aided instruction systems.

In any case where the system (a), (b), or (c) is employed, the teaching method called "a frame-type teaching method" develops the essential function in the system. The frame-type teaching method adopts frames as a teaching tool. The frames are associated with sequentially ordered electronic images, which are presented to the user in a sequential order like picture cards in a picture-card show. In a process of the sequential presentation of the frames, teaching items such as an exercise are inserted between frames to check the status of the progress of the user so as to subsequently present a teaching material suitable for the status. In this system, to cope with various changes in the status of the progress of the user, materials associated therewith and information related to the materials are required to be beforehand embedded statically in the program of the system. However, it is impossible to incorporate the information items coping with all possible statuses of the progress.

In an ordinary learning environment not using a computer, the teacher can dynamically select an appropriate teaching material for the user depending on the status of the progress. Moreover, the user can learn information other than the predetermined information from the teacher. In contrast therewith, in a learning environment employing a computer, the user cannot freely choose a teaching material depending on the status of the learning progress; furthermore, the user can reference only the information embedded in the system. Namely, it is only allowed for the user to check the teaching materials in several predetermined orders.

In addition, in an ordinary learning environment not using a computer, the teacher can give an appropriate advice or instruction to the student while checking an identical teaching material together with the student. However, such a usual learning environment cannot be implemented by the system (a), (b), or (c) for the following reasons. That is, it is not possible to share an identical screen image between physically separated computers and hence the teacher and the student cannot view the same screen image. Moreover, even when either one of the teacher and the student accomplishes an operation for the screen image, the result of the operation cannot be reflected onto the screen image of the computer of the communicating partner.

In order to achieve the objects above, according to one feature of the present invention, there is provided a favorable mode of embodying the computer assisted learning support system comprising a storage for storing therein blocks of a teaching material respectively assigned with teaching material identifiers and link information which represents by a pair of identifiers of a teaching material a relationship between blocks of the teaching material, each of the blocks being attained by subdividing the teaching material according to contents thereof; a display for presenting, in a change-over manner, a screen image of the blocks of the teaching material and a screen image of the contents of the blocks of the teaching material and the link information including the teaching material identifiers respectively assigned to the blocks of the teaching materials; an input device for inputting therefrom a selection item for one of the blocks of the teaching material presented on said display and a selection item for one of the contents of the blocks of the teaching material and the link information; first means, responsive to the selection item from said input device for the block of the teaching material, for reading from said storage the contents of the selected block of the teaching material and the link information including the teaching material identifier of the selected block of the teaching material and for outputting the obtained items to said display; and second means, responsive to the selection item from said input device for the link information, for reading from said storage the contents of a different block of the teaching material which has a teaching material identifier not contained in the selected link information and which is not presented on said display and different link information including the teaching material identifier of the different block of the teaching material and for outputting the attained items to said display.

In another preferred configuration of the computer assisted learning support system, there are provided, in addition to the constituent components above, means for achieving transfer operations of data and/or commands to and from other computers such that events occurring the the respective computers are transferred to each other via the transfer means In the computer having received the transferred event, the received information is processed in a processing manner which is adopted to process information supplied from an input device connected thereto, thereby realizing a collaborative operation between a plurality of computers.

In accordance with the preferred mode of embodying the present invention, a teaching material is subdivided according to predetermined units to define links denoting relationships between the units and information of the links are continuously displayed on a screen, thereby allowing the user to freely traverse between teaching materials by specifying information of the links. In short, by tracing information of the links, necessary information can be easily referenced. In addition, links can be defined for portions of each teaching material so that there can be attained information such as a more detailed description of a desired portion of the teaching material and a slightly particular information item thereof. Moreover, a collaborative operation can be achieved between a plurality of computers via a computer network so that information of an operation of a computer is transferred to the other computers, thereby realizing a learning environment shared among the plural computers. For example, in the system according to the present invention, there can be achieved an education with a highly close relationships between the student and the teacher, which leads to a satisfactory efficiency of education.

BRIEF DESCRIPTION OF THE DRAWINGS

These and other objects and advantages of the present invention will become apparent by reference to the following description and accompanying drawings in which:

FIG. 4 is a diagram showing a presentation format of link information;

FIG. 5 is a diagram showing a presentation format of a part of the block of the teaching material;

FIG. 17 is a structural diagram showing the construction of a dictionary for a syntactic analysis;

FIG. 18 is a diagram showing a result of the syntactic analysis achieved by the processing of FIG. 15;

FIG. 23 is a diagram showing the hardware structure of a support system for the monitor operation conducted by a plurality of users;

FIG. 25 is a flowchart showing the processing of the system conducted according to a history of the learning.

DESCRIPTION OF THE PREFERRED EMBODIMENTS

Figure 1:
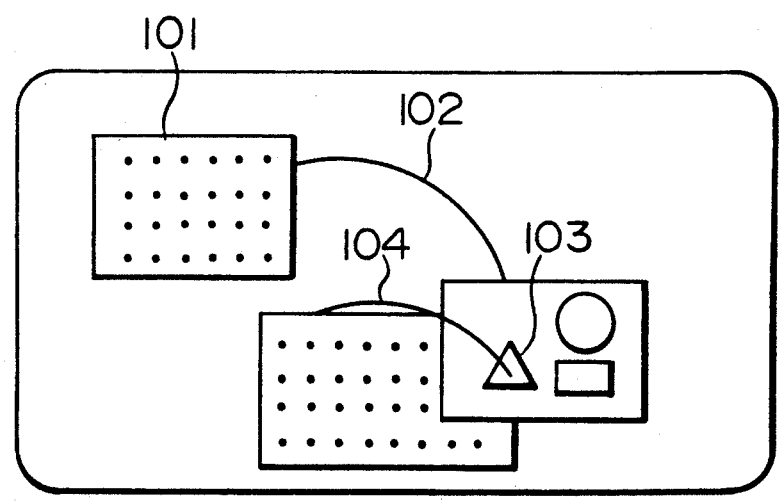
FIG. 1 is a diagram showing an example of a display screen of a computer assisted learning support system in an embodiment according to the present invention.

Referring now to the drawings, description will be given in detail of an embodiment of the present invention.

FIG. 1 schematically shows a display screen image presented on a display In FIG. 1, a reference numeral 101 denotes an area or field for displaying therein a block of the teaching material (the block is attained by subdividing the teaching material according to a preset unit), 102 indicates a link or linkage showing a relationship between the block 101 of the teaching material and another block thereof, 103 stands for a portion of the block 101 (the portion is called a part of the block of the teaching material), and 104 is a linkage showing a relationship between the part 103 of the block of the teaching material and another part thereof. In the presentation on the display, however, the link information items 102 and 104 need not be necessarily displayed as shown in FIG. 1, namely, these items may be presented, for example, with names assigned thereto in an area other than the area of the block of the teaching material.

Figure 2:
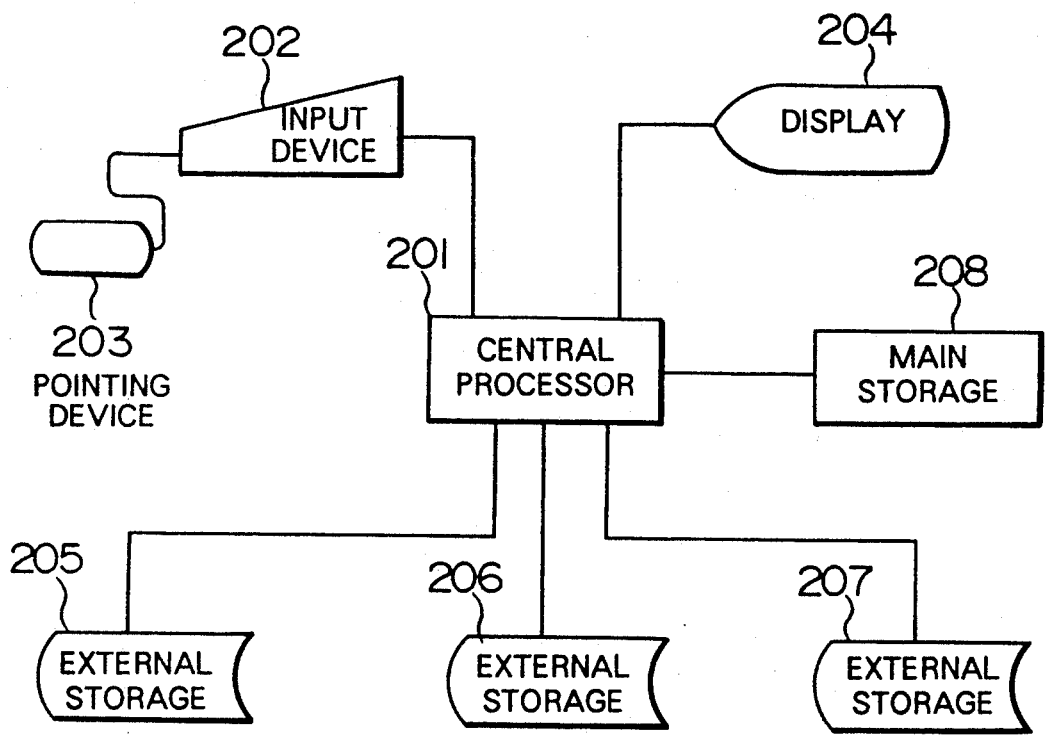
FIG. 2 is a schematic diagram showing the hardware configuration of the computer assisted learning support system in the embodiment according to the present invention.

FIG. 2 is a diagram showing the hardware structure of a computer assisted learning support system. In FIG. 2, reference numeral 201 designates a central processor for executing the learning support processing, 202 indicates an input device such as a keyboard for inputting a command and the like from a teacher or a student, 203 denotes a pointing device such as a mouse for inputting an indication of a position on the screen of a display, 204 stands for a display, 205 is a file for storing therein blocks of the teaching material, 206 denotes a block link information file for storing therein link information indicating relationships between blocks of the teaching material, 207 is a part link information file for storing therein link information defined for parts of a block of the teaching material, and 208 designates a main storage for storing therein a processing program to be executed by the central processor 201 and data to be processed.

Figure 3:
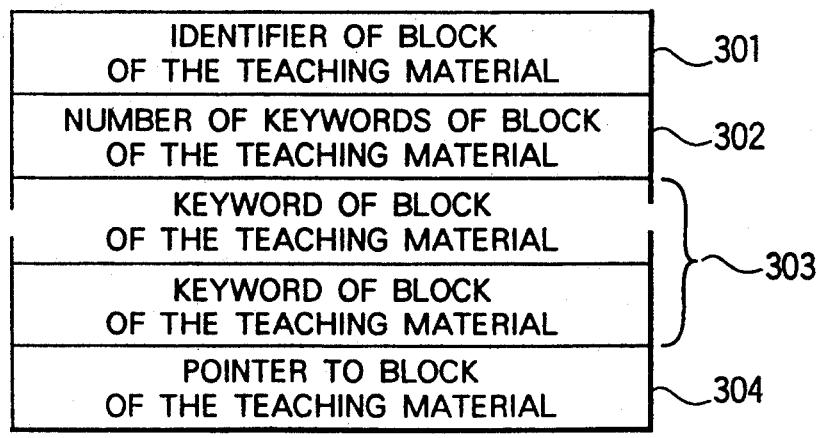
FIG. 3 is a diagram showing a method of representing data for a block of the teaching material.

FIG. 3 shows the structure of a record (data related to a block of the teaching material) stored in the block material file 205. Reference numeral 301 indicates an identifier for identifying the block, 302 stands for the number of keywords assigned to the block to represent characteristics thereof, 303 denotes a keyword representing a characteristic of the block, and 304 designates a pointer to an area where an actual body of the block is stored. The pointer 304 is a name or a first address of a file in which an actual body of the block is stored. Since the body of the block is not directly related to the substance of the present invention, a detailed description thereof will be omitted.

FIG. 4 shows the layout of a record (link information) stored in the link information file 206. Reference numeral 401 denotes an identifier indication code indicating that the pertinent record contains link information, 402 stands for an identifier denoting a block of the teaching material as a link source, 403 designates a name assigned to the link, 404 indicates a teaching material identifier denoting a block of the teaching material as a link destination, and 405 is an identifier indicating a type of the block of the teaching material as a link destination.

FIG. 5 shows the configuration of a record (data related to a part of a block of the teaching material) stored in the part link information file 207. Link information defined for a part of a block of the teaching material to indicate a relationship with another block of the teaching material is represented by items 501 to 508 as shown in FIG. 5. Reference numeral 501 designates an identifier indicating that the data is a part of a block of the teaching material, 502 denotes an identifier of a block of the teaching material including the part, 503 is an identifier indicating a type of the part of a block of the teaching material, 504 is start point information indicating the start point of the part, 505 denotes end position information indicating the end position of the part, 506 is a link name, 507 is an identifier of a block of the teaching material as a link destination, and 508 is an identifier indicating a type of a block of the teaching material as a link destination.

The start position information 504 and the end position information 505 are represented in different manners depending on types of the part of a block of the teaching material. For example, when the block is text data, each of the start and end positions is expressed by a row and a column. When the block is graphic or image data, each position is represented with values of coordinates respectively of the upper-left and lower-right positions of a Cartesian coordinate system with its origin set to a point predetermined therein.

Figure 6:
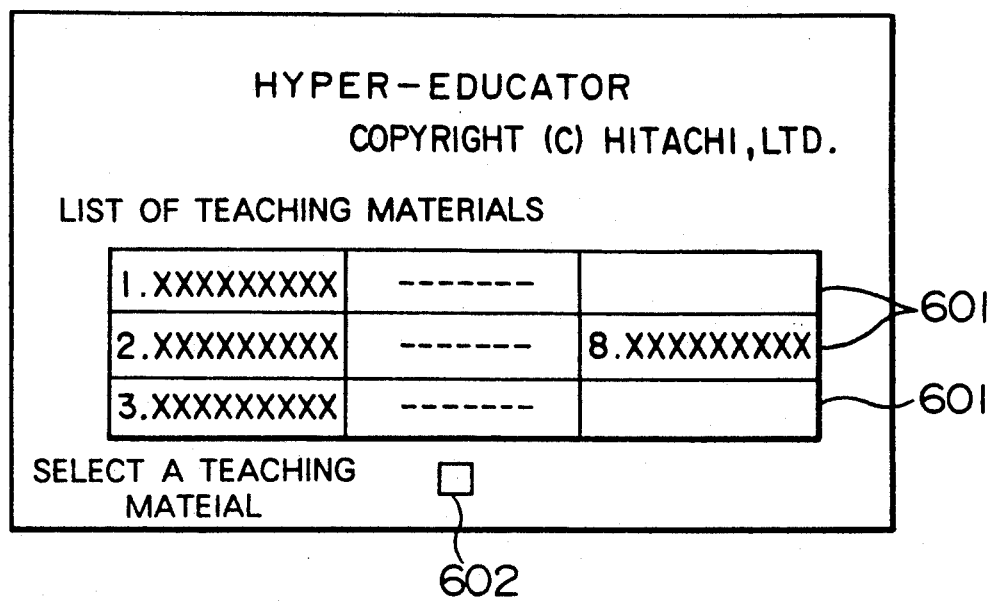
FIG. 6 is a diagram showing an initial screen displayed when the system is started.

FIG. 6 shows the initial screen image displayed on the display 204 when the computer assisted learning support system is initiated. Reference numeral 601 denotes a teaching material list display field for presenting identifiers of blocks of the teaching material as an object of the learning and 602 designates a teaching material selection field for inputting therein information indicating a teaching material to be selected from the list display field 601.

Figure 7:
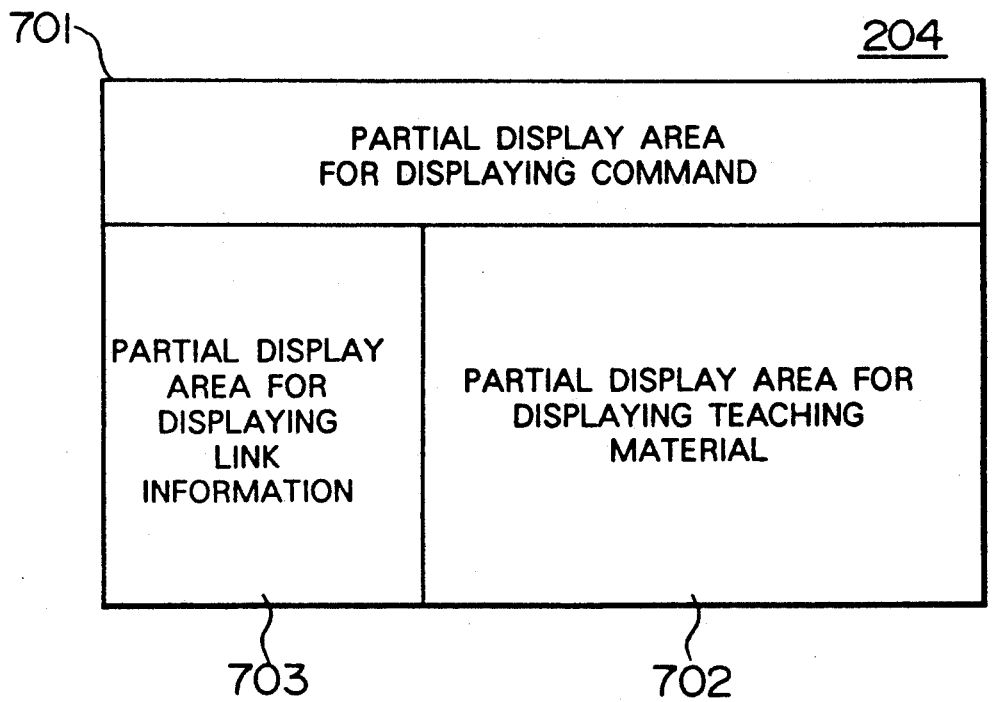
FIG. 7 is a diagram showing an example of the display format of a block of the teaching material.

FIG. 7 is an example of a display image of a block of the teaching material on the display 204. Reference numeral 701 is a block display field for displaying a command or the like inputted by the user according to the block information displayed, 702 stands for a block display field for displaying the contents of a block of the teaching material, and 703 indicates a block display field for displaying the link information defined for the displayed block of the teaching material.

Figure 8:
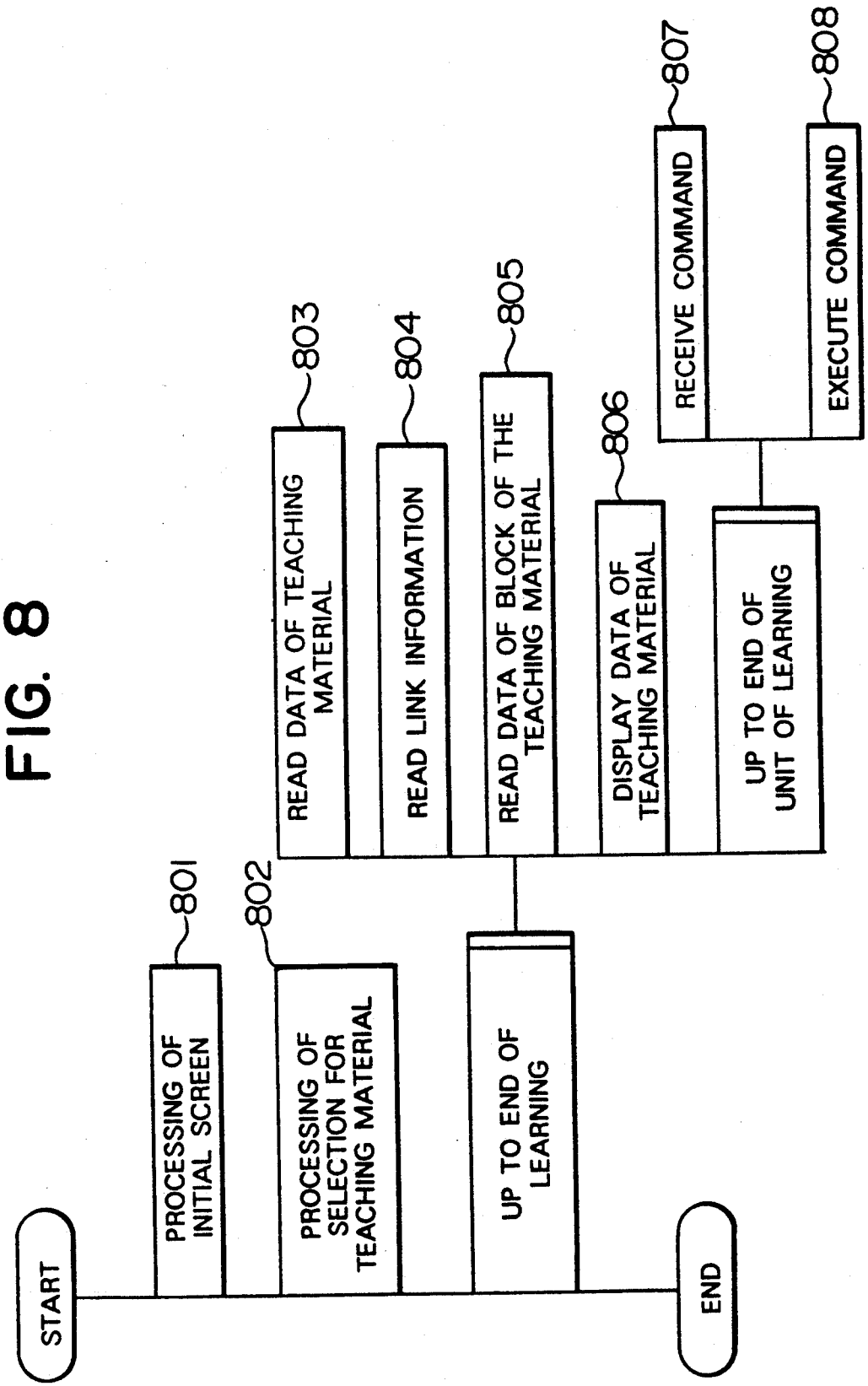
FIG. 8 is a flowchart showing the operation of implementing the computer assisted learning support system of the embodiment.

FIG. 8 is a flowchart of the processing executed by the central processor 201 in this embodiment.

First, for a selection of a teaching material, the initial screen shown in FIG. 6 is displayed. Specifically, the contents of the file 205 are read therefrom to be moved onto the main storage 208 and then the identifiers 301 of the blocks of the teaching material are displayed in the format of FIG. 6 (step 801). Subsequently, the user supplies a selection input for a teaching material from the input device 202 or the pointing device 203. When the input device 202 is used, a number assigned to the block of the teaching material is inputted; whereas when the pointing device 203 is employed, the click position is inputted, namely, the system recognizes the name of the block of the teaching material according to the position (step 802). To allow the user to confirm the contents of the selection of the teaching material, the identifier of the selected block of the teaching material is displayed in the selection field 602. Each of the subsequent steps is repeatedly executed until the user completes the processing or operation of the selected teaching material.

For the selected block of the teaching material, the actual body of the selected block of the teaching material is read into the main storage 208. In more detail, the contents of an area (file) indicated by the pointer 304 to the actual body of the selected block are read to be stored in the main storage 208 (step 803). From the link information file 206, link information for which the identifier 402 indicates the selected block is acquired to be stored in the main storage 208 (step 804). Moreover, from the part link information file 207, a part of a block of the teaching material for which the identifier 502 indicates the selected block is obtained to be stored in the main storage 208 (step 805). Next, information items attained through the steps 803 to 805 are displayed on the screen of the display 204 in the format of FIG. 7. First, the data obtained in the steps 803 and 805 is displayed in the field 702 and then the link information acquired in the step 804 is displayed in the field 703. Subsequently, a command associated with the block of the teaching material is displayed in the field 701. The command is, for example, "Delete", "Edit", "Add", or "End" (step 806).

Next, the command inputted from the input device 202 or the pointing device 203 is received (step 807). To process the command, a processing program corresponding to the inputted command is invoked or activated (step 808). Until a command designating the termination is inputted for the block of the teaching material, the steps 807 and 808 are repeatedly executed. Through the operations above, the processing of a block of the teaching material is finished.

Figure 9:
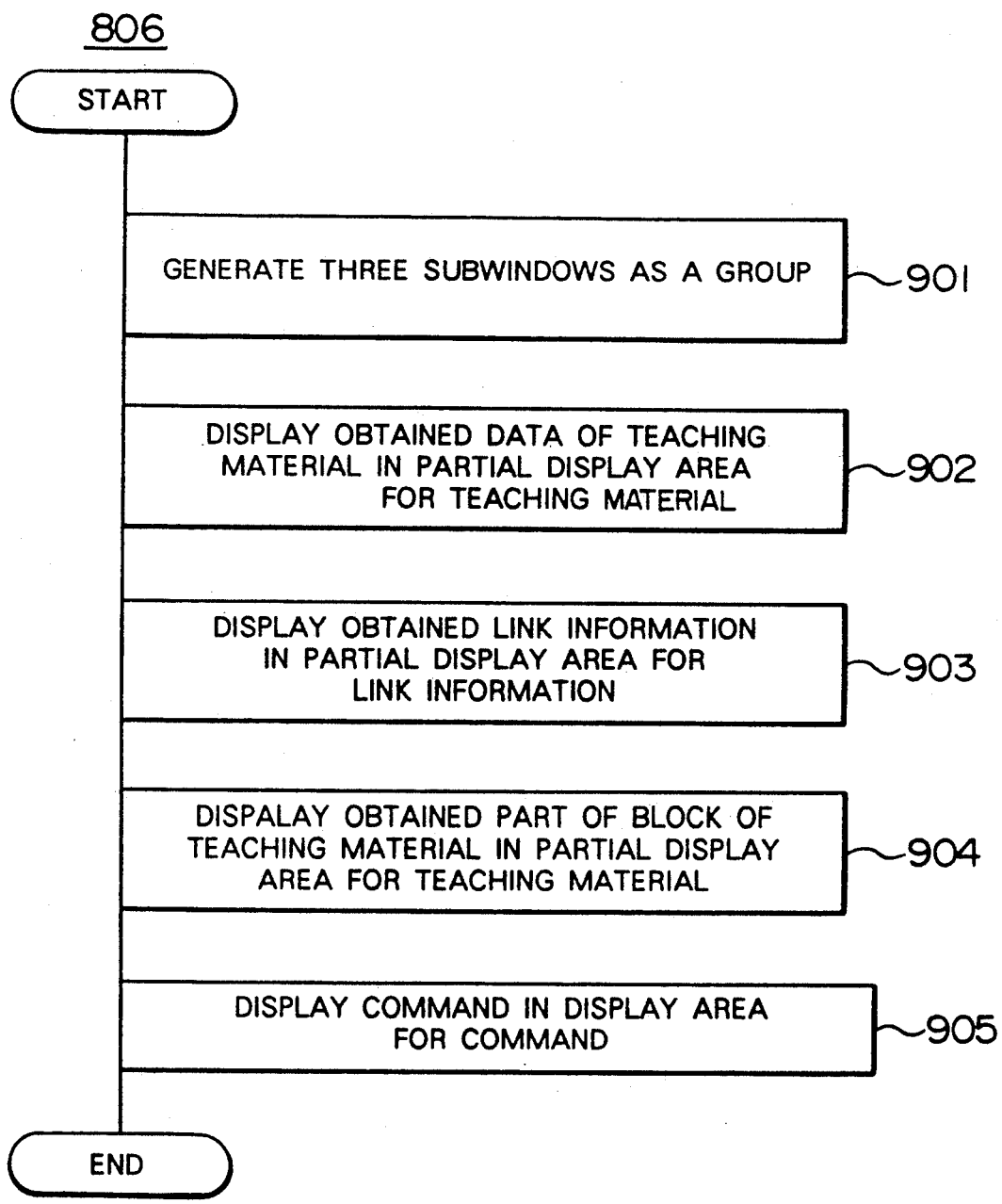
FIG. 9 is a flowchart showing a display processing of data of the teaching material in FIG. 8.
Figure 10:
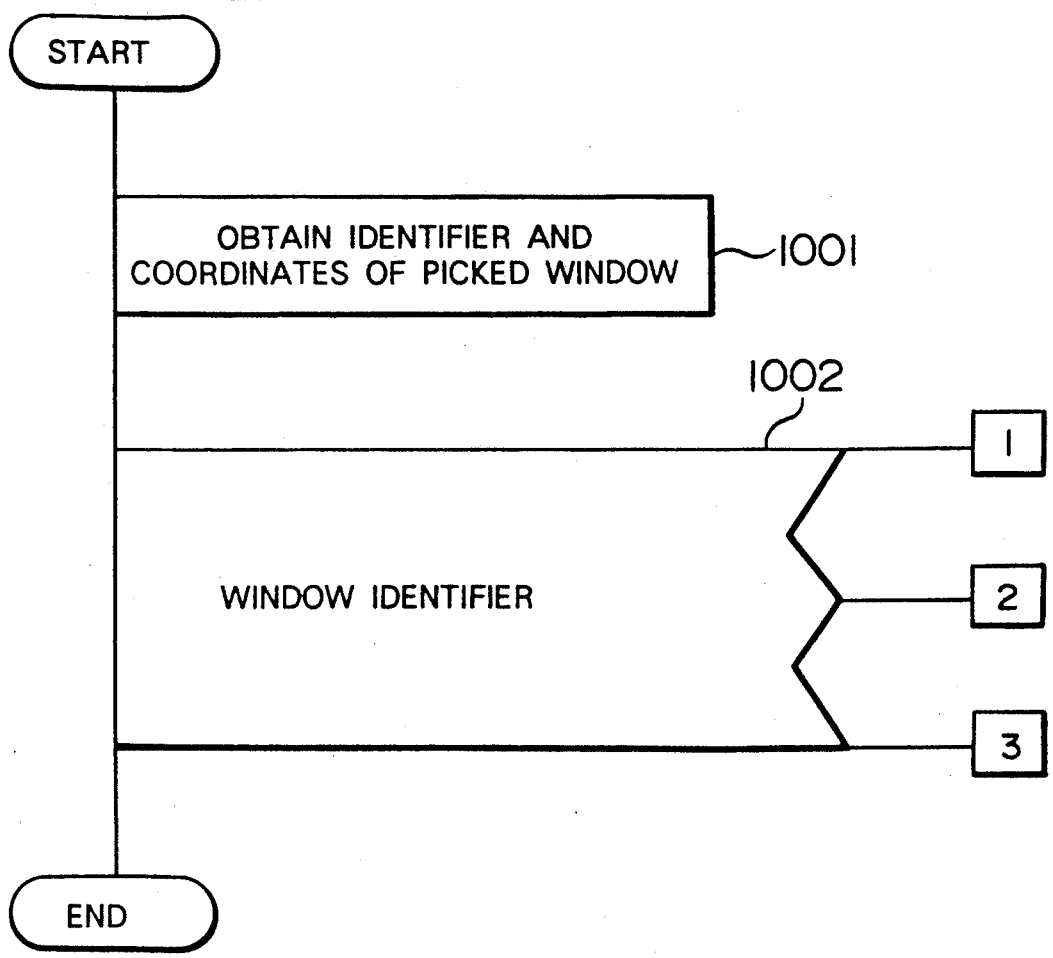
FIG. 10 is a portion of a flowchart showing the operation of receiving and executing a command in FIG. 8.
Figure 11:
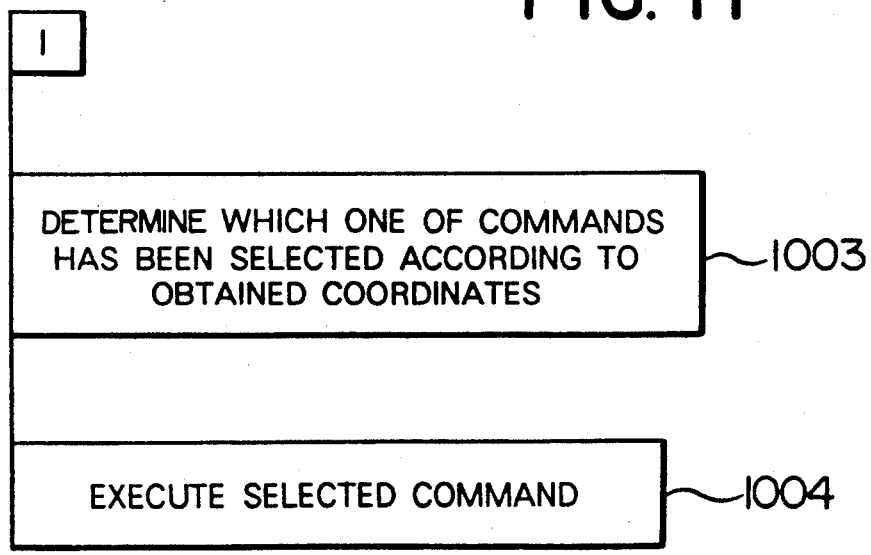
FIG. 11 is another portion of the flowchart showing the operation of receiving and executing a command in FIG. 8.
Figure 12:
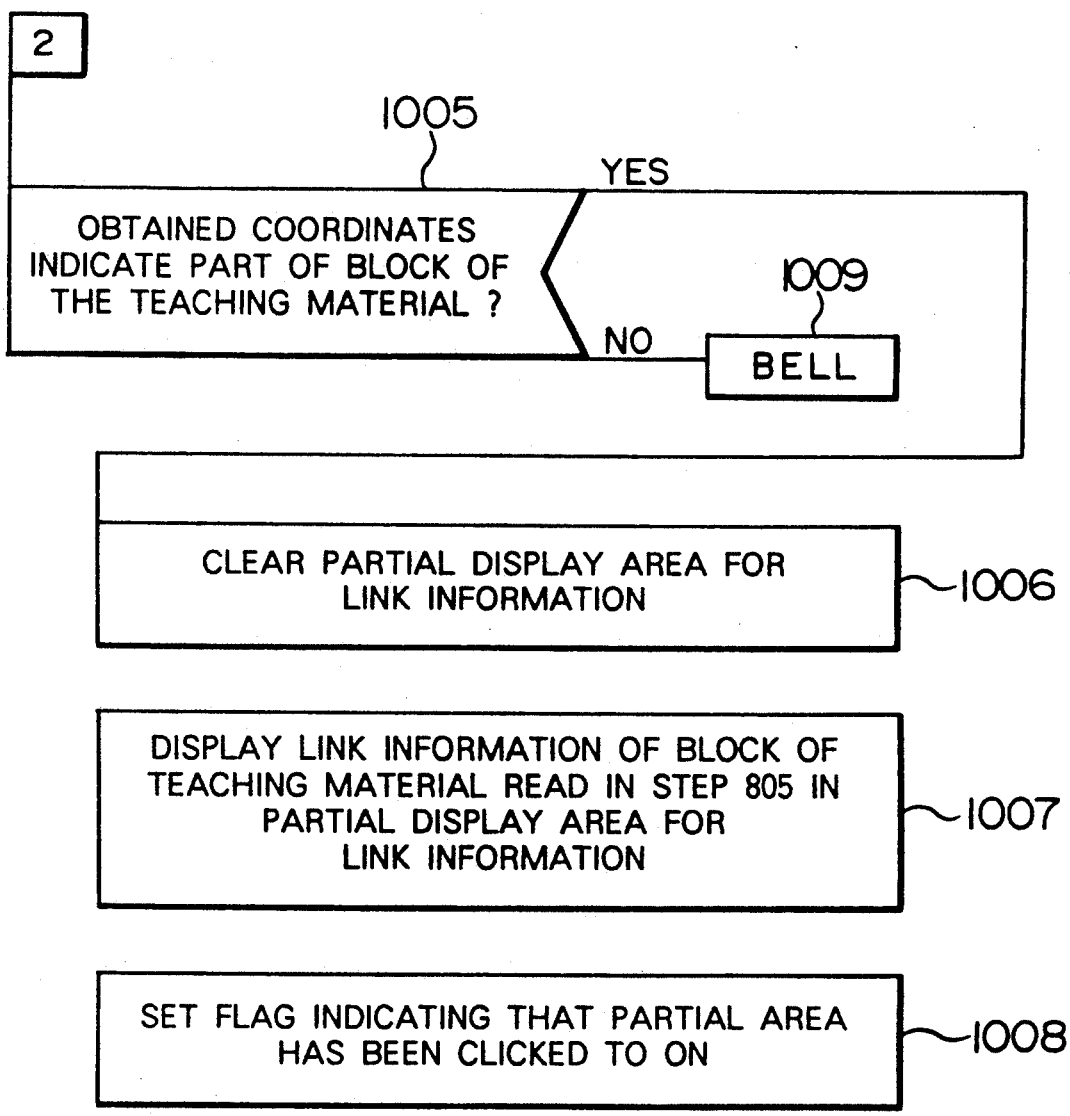
FIG. 12 is still another portion of the flowchart showing the operation of receiving and executing a command in FIG. 8.

Referring now to FIG. 9, description will be given in detail of the display processing of the step 806. The display 204 supports a multi-window system in which a plurality of windows are displayed on a screen. In this example, partial display areas or regions 701, 702, and 703 of the screen of FIG. 7 are assigned to the respective windows, which are managed (displayed and processed) as a group.

First, three windows are generated and are registered as a group so as to be collectively operated as a window (step 901). When the known X window system is adopted, there is produced a window including the three windows above. The window is called in this specification a root window for convenience. Next, subwindows associated with the partial fields 701 to 703 of FIG. 7 are created as sub-windows of the root window. Each of the plural windows thus generated as subwindows can be operated as a separate window Each subwindow is assigned with a unique identifier. In this case, subwindow identifiers s-w-1, s-w-2, and s-w-3 are respectively assigned to the subwindows corresponding to the fields 701 to 703, respectively An identifier s-w-0 is assigned to the root window for collectively identifying and handling these three subwindows.

Subsequently, data of the block of the teaching material obtained in the step 803 is displayed in the subwindow s-w-2 (step 902). Link information attained in the step 804 is presented in the subwindow s-w-3 (step 903). Data of the part of the block of the teaching material obtained in the step 805 is displayed in the subwindow s-w-2 (step 904). For the operation above, the size of the display region of the part of the block is computed according to information of positions where the part is to be displayed. For example, in a case of text data, the size of the display region is calculated according to the row and the column of each of the start and end positions and the numbers of dots necessary for displaying one character in the vertical and horizontal directions. In addition, when displaying image or graphic data, the display area size can be computed according to data of the coordinates of the upper-left and lower-right corners thereof. The resultant window having the same size as the display area is generated as a subwindow of the subwindow s-w-2 (namely, with the subwindow s-w-2 set as a root window, another subwindow is generated for each of the block part display region). Thereafter, data of the part of a block of the teaching material is displayed in the subwindow. This processing is repeatedly executed for each of the block parts read in the step 805, thereby terminating the display of the parts of the block of the teaching material. Finally, an icon or the like denoting a command is presented in the subwindow s-w-1 (step 905). Through the operations above, the display processing of the step 806 (display of data of the teaching material) is completely achieved.

Referring now to the processing flowcharts of FIGS. 10 to 13, description will be given in detail of the command reception and execution processing respectively of the steps 807 and 808 of FIG. 8.

When the screen of the display 204 is clicked or picked by the pointing device 203, information items of the picked window and the picked position thereof are obtained. The information items are represented in the form of a pair including a window identifier and coordinates of the picked position (step 1001). Next, according to the type determined by the window identifier, namely, the type of the picked window, the processing step proceeds to one of three branches (1, 2, 3; step 1002).

When the field 701 for the command display is picked, the branch 1 is executed. Namely, the specified command is determined according to the coordinates of the picked position (step 1003). A processing program corresponding to the specified command is invoked and then control returns to the command reception step 807 (step 1004).

When the filed 702 is picked for the teaching material display, it is checked whether or not the attained coordinates indicate the subwindow for displaying a part of a block of the teaching material. Concretely, it is examined whether or not the positions represented by the coordinates are within the part display window (subwindow) computed in the step 904 (step 1005). If this is not the case, an error is assumed and the pertinent condition is notified, for example, by sounding a bell (step 1009). If this is the case, the field 703 for the link information display is cleared (step 1006). The link name 506 of the link information of the part of the block read into the main storage 208 is displayed in the display field 703 (step 1007). Moreover, for the later processing, a clicked flag related to the part of the block of the teaching material is set to ON to indicate that the part of the block has been picked. The flag, although not shown, is disposed in a work area of the main storage 208 (step 1008).

When the field 703 is picked, the branch 3 is effected to determine the specified link information according to the obtained coordinates (step 1010). The window presenting the block of the teaching material is erased (step 1011). If the clicked flag has been set to ON in the step 1008, the steps 803 to 806 are repeatedly executed to open the block of the teaching material specified by the name 507 denoted in the link information of the part of the block read in the step 805, thereby returning control to the command reception step 807 (step 1012). Furthermore, when the clicked flag is off, the steps 803 to 806 are repeatedly executed to open the block of the teaching material specified by the link destination 507 denoted in the link information read in the step 804, thereby returning control to the command reception step 807 (step 1013). With the operation above, the command processing is terminated.

In this regard, according to the embodiment above, the X window system has been adopted as premise of the processing for simplification of description. However, since the function similar to that described above is also supported by other multiwindow systems, the contents of the description is applicable to any window systems.

Figure 13:
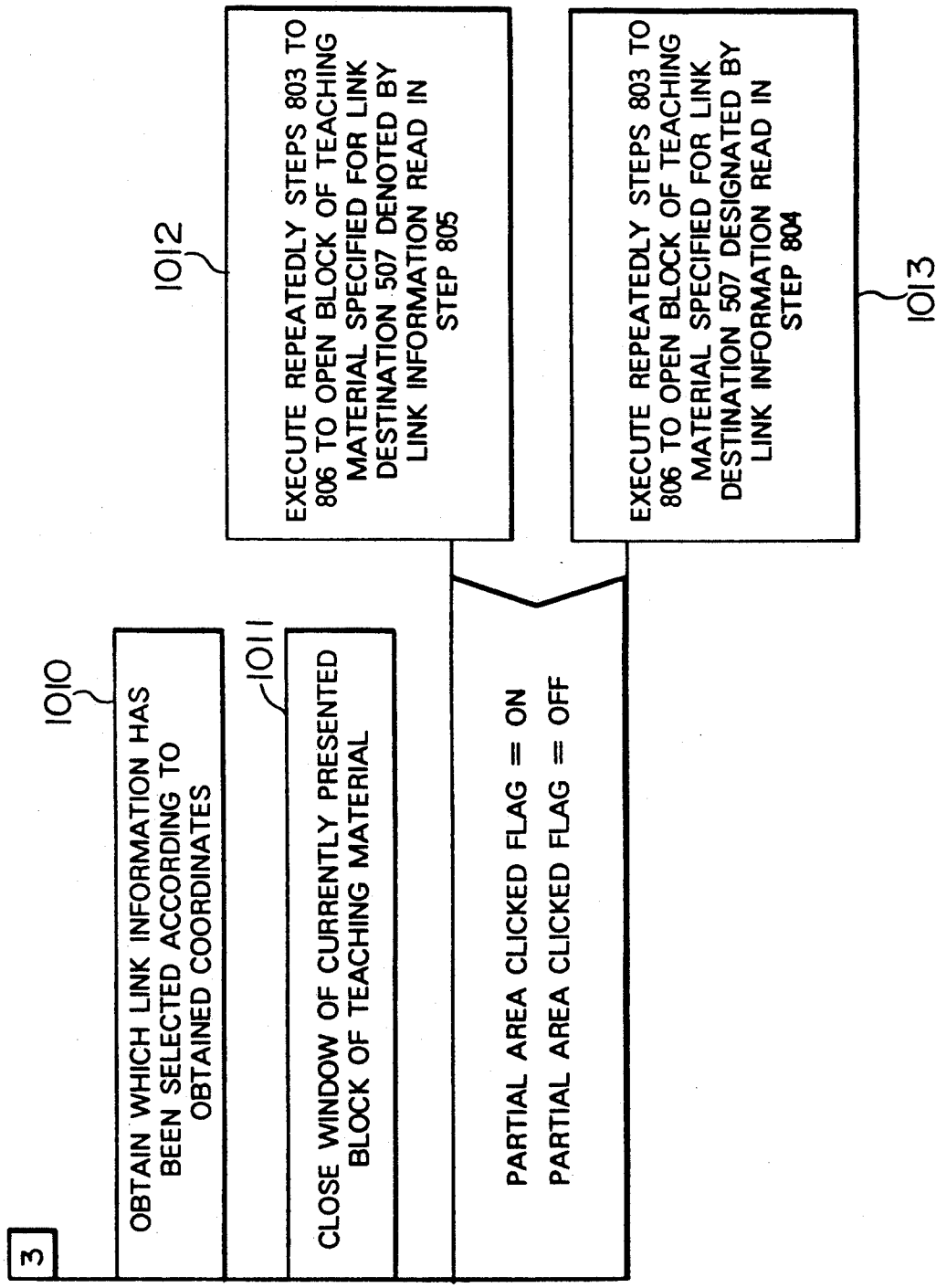
FIG. 13 is further another portion of the flowchart showing the operation of receiving and executing a command in FIG. 8.
Figure 14:
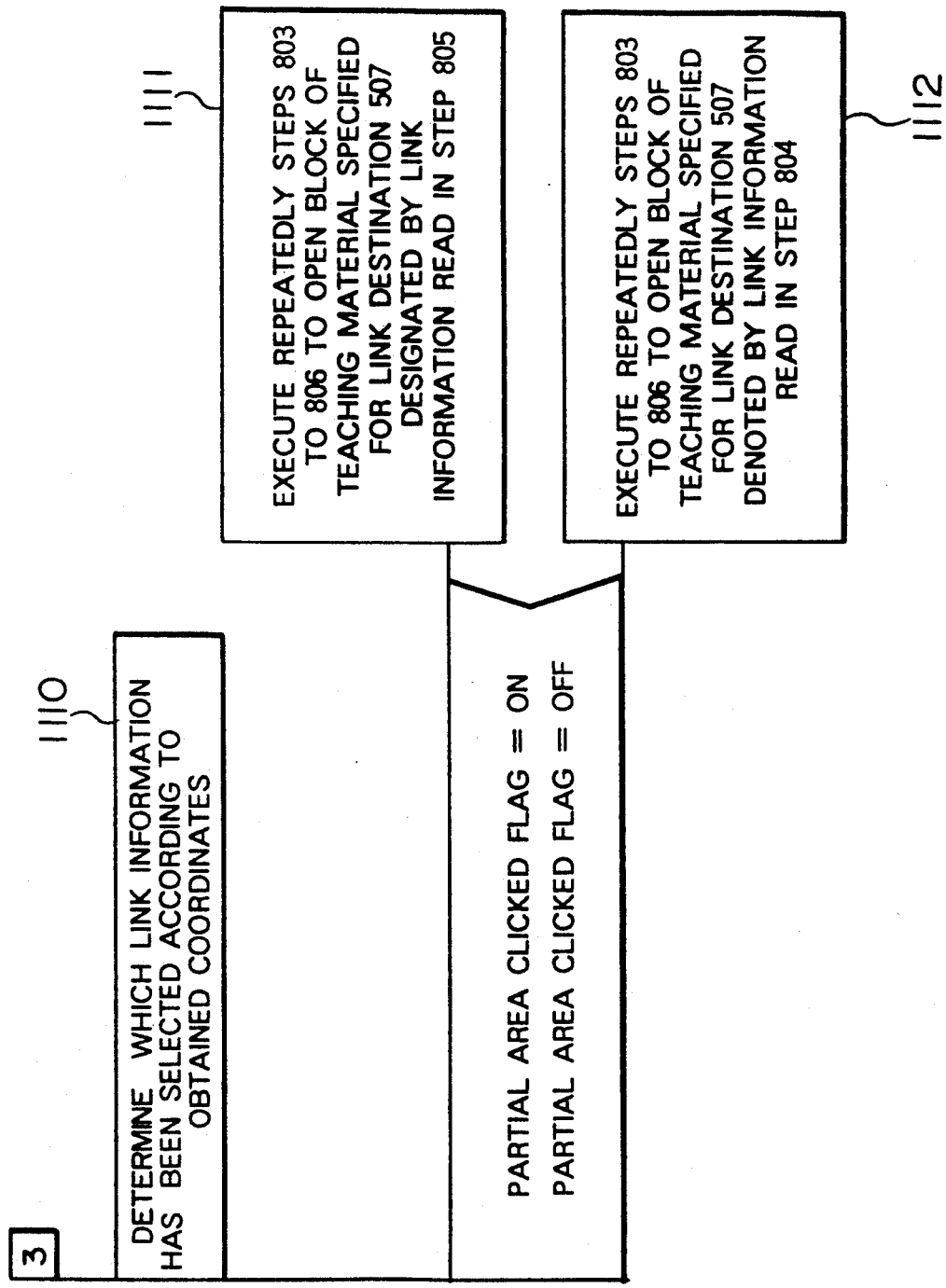
FIG. 14 is a flowchart showing a variation of the processing of FIG. 13.

Referring next to FIG. 14, description will be given of a variation of the processing shown in FIG. 13. A multiprocessing system (multitasking function) supported by many computers is utilized in this example. The processing of FIG. 14 differs from that of FIG. 13 in that there is missing a step corresponding to the step 1011 and the display window currently presented for a block of the teaching material is not closed. In place thereof, in steps 1111 and 1112 respectively associated with the steps 1012 and 1013 of FIG. 13, there is generated a process (task) for displaying in another window a new block of the teaching material by the multiprocess function. A program developing an identical function is created as another different process and then processing shown in FIGS. 8, 9, and 14 is invoked for the specified block of the teaching material set as an object of the processing. Thanks to the multiprocessing function, a new root window is produced in accordance with the generation of a process, thereby enabling the user to input items in the respective root windows. When this function is employed, as a command to be presented in the part display field for the command display, there is prepared a command to close the block of the teaching material.

Referring next to the flowchart of FIG. 15, description will be given of another example of the step 802 (processing for selecting a teaching material). Information of a retrieval is inputted (step 1201) and then the retrieval is executed according to the retrieval information (step 1202) so as to display a result of the retrieval (step 1203). These steps are specifically achieved as follows. Keywords are assigned to each block of the teaching material such that in response to an input of keywords, a block of the teaching material associated with the keywords are displayed. Moreover, when the input is other than keyword, namely, a sentence containing keywords expressed in a natural language, keywords are extracted from the character string. The processing will be subsequently described in detail.

Figure 15:
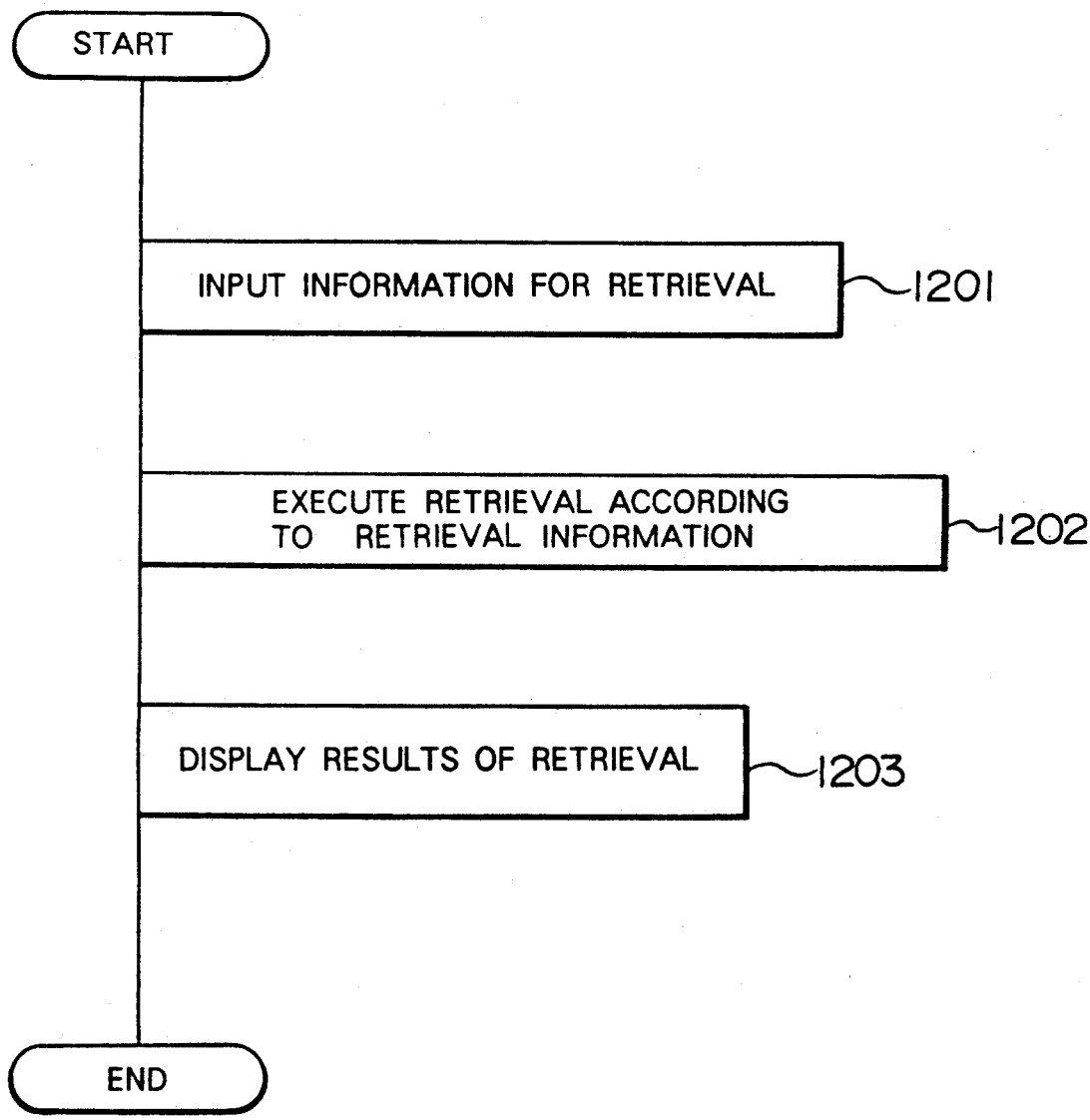
FIG. 15 is a flowchart showing the operation of selecting a teaching material through a retrieval by the natural language.
Figure 16:
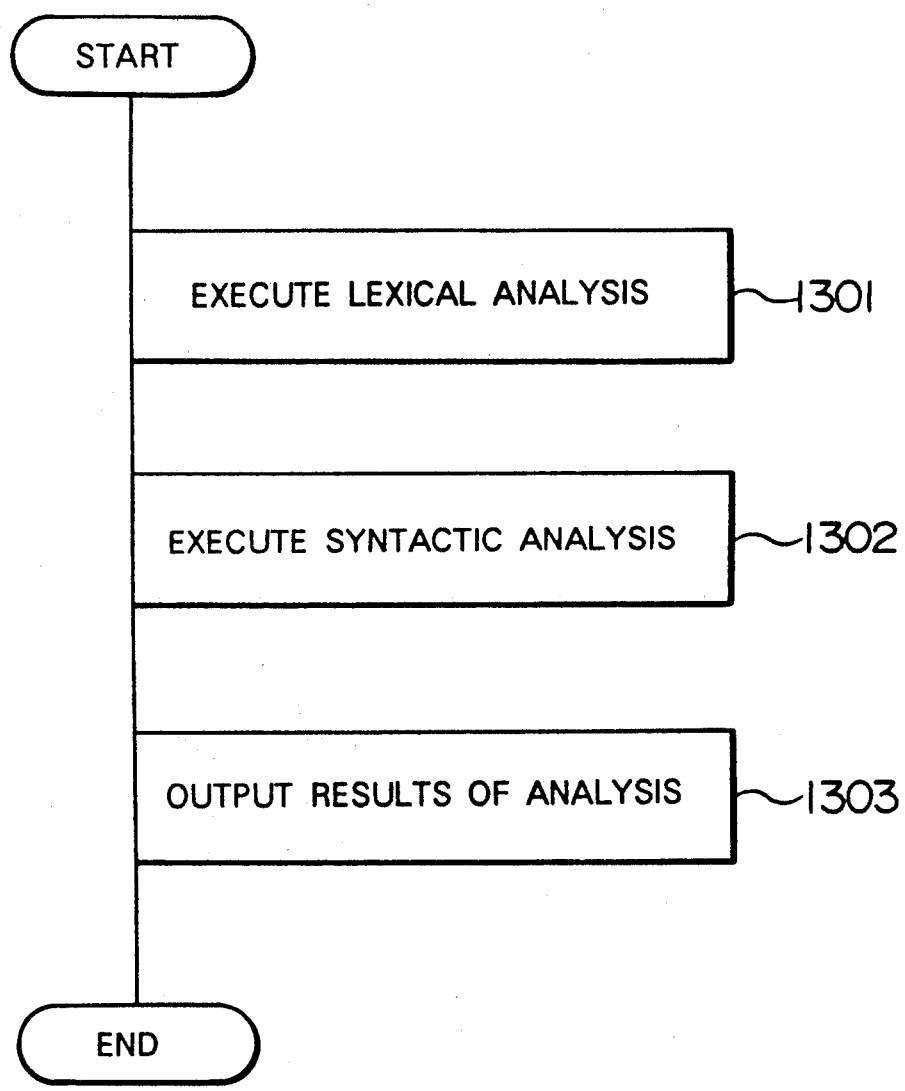
FIG. 16 is a flowchart showing the operation of analyzing the natural language in the processing of FIG. 15.

FIG. 16 is a flowchart showing the processing of a natural language analysis achieved in a step 1201 of FIG. 15. First, types of inflection are determined for inflectional words of an inputted sentence and then prefixes, suffixes, and the like are processed, thereby conducting a lexical analysis to determine paragraphs (step 1301). Next, a syntactic analysis is carried out for the inputted sentence to determine the syntactic structure thereof (step 1302) and then the results obtained by the analyses above are outputted (step 1303).

FIG. 17 shows the layout of data of a dictionary adopted in the natural language analysis shown in FIG. 16. In this diagram, reference numeral 1401 denotes an index field defining a type of inflection of the inflectional word and a type of a prefix, a synonym, or the like, 1402 designates a normal word field for resolving ambiguity of words of the index and indicating a representative word, and 1403 stands for a code field containing a code indicating a predetermined part of speech or meaning. In the code field 1403, for a word which can be used as a keyword of a retrieval, there is beforehand assigned a particular code, for example, a code "kw" designating "this word can be used as a keyword of a retrieval". Furthermore, for a word such as a post positional word functioning as an auxiliary to a main word, an auxiliary word, or a conjunction which cannot be used as a keyword of a retrieval, there is assigned in this field a meaning code when necessary. In this example, a code "n-kw" denoting that "this word cannot be used as a keyword of a retrieval" is assigned The dictionary data shown in FIG. 17 can be stored, for example, in the main storage 208 of FIG. 2.

FIG. 18 shows the configuration of table data representing the result of the syntactic analysis achieved in the step 1303 of FIG. 16 for the inputted natural language sentence. In this diagram, reference numeral 1501 indicates a paragraph number field denoting a number of a paragraph obtained as a result of the input sentence analysis, 1502 designates a paragraph field containing a paragraph, 1503 is a normal word field representing a normal word contained in the paragraph field 1502, and 1504 denotes a meaning code field indicating a code of the part of speech or meaning of the normal word. The contents of the analysis results shown in FIG. 18 are stored in the main storage 208.

The operation will be described in detail by referencing FIGS. 15 to 18.

When the processing of FIG. 15 is invoked, a character string is inputted to request a retrieval (step 1201). When the retrieval request is inputted in a keyword format, control is passed to a retrieval execution processing (step 1202); whereas, when the retrieval request is supplied as a retrieval sentence in a natural language, the processing of FIG. 16 is accomplished to analyze the retrieval sentence expressed in the natural language. First, the input sentence is subjected to a lexical analysis (step 1301) to be subdivided into paragraphs. For each of the paragraphs, the following operation is repetitiously executed. The objective paragraph is collated with each index 1401 of FIG. 17 to find out any index matching the paragraph. For such an index, a normal word 1402 and a code 1403, which are associated therewith, are respectively stored in the analysis result table of FIG. 18, namely, in the normal word field 1503 and the code field 1504 related to a node number 1501 (sequentially assigned to each of the subdivided paragraphs). After the processing is completely achieved for the respective paragraphs, a check is made through the code fields 1504 of the analysis results shown in FIG. 18 to collect any normal words 1503 which can be used as a keyword, namely, which has a meaning code set as "kw". These normal words 1503 form a set of keywords denoting the block of the teaching material specified by the user. For example, when there exist m keywords forming a set, meaning or semantic codes kw - 1 to kw - m are assigned to the respective keywords. In this regard, when the user directly specifies a keyword, not a natural language sentence, the items kw - 1 to kw - m are directly obtained in the step 1201 of FIG. 15. After the set of keywords are attained, a retrieval is executed (step 1202) to search for the necessary block of the teaching material. The retrieval procedure is accomplished in accordance with the flowchart of FIG. 19.

Figure 19:
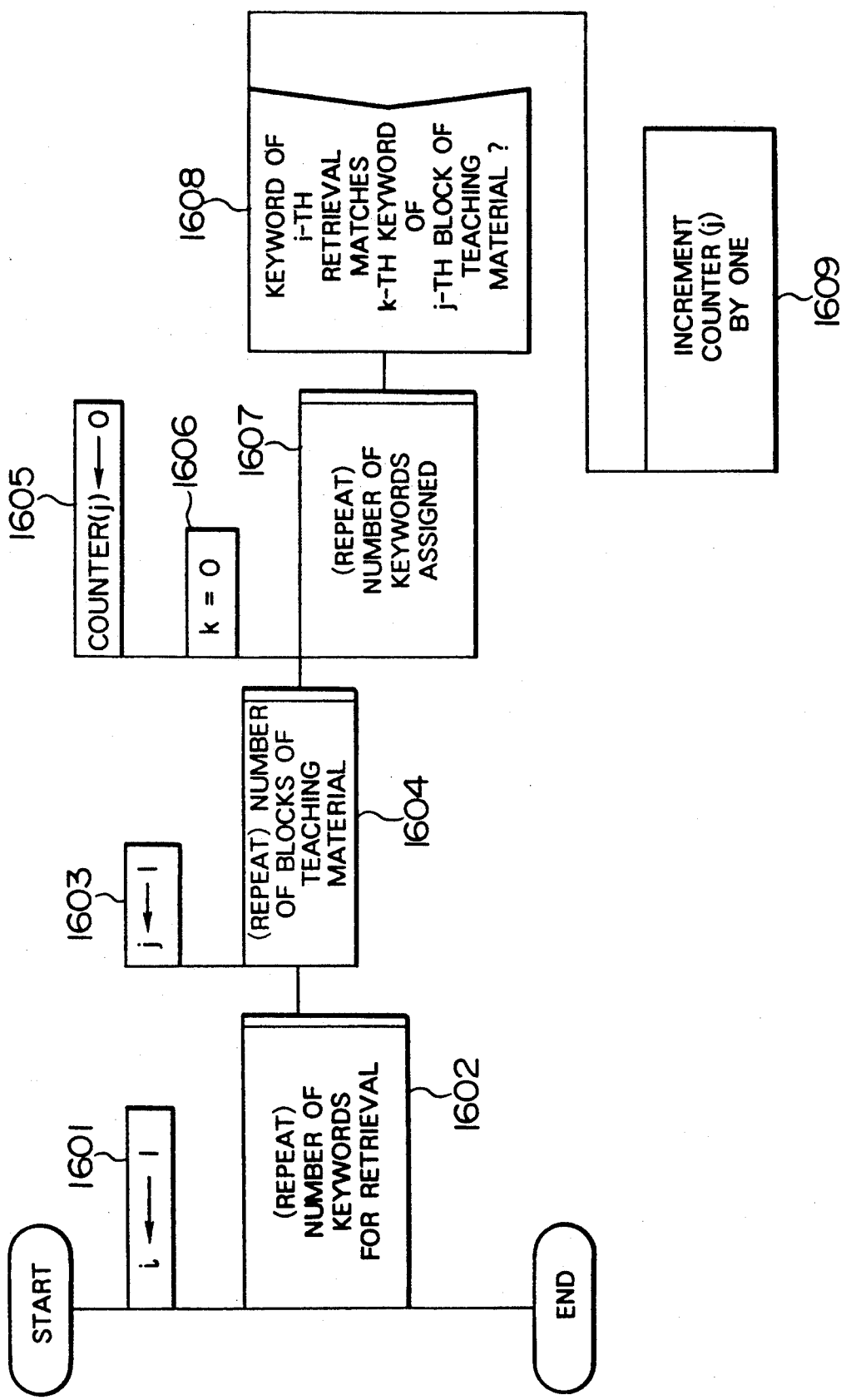
FIG. 19 is a flowchart showing an example of the processing for retrieving a block of the teaching material in the processing of FIG. 15.

FIG. 19 is a flowchart showing the retrieval procedure in a case where p blocks of the teaching material (ft) are present. As for terms used in the description of this flowchart, kw - i stands for an i-th keyword and ft - j is an identifier denoting a j-th block of the teaching material.

While sequentially incrementing by one the number of keywords beginning from i=1 (steps 1601 and 1602) and the number of blocks of the teaching material by one beginning from j=1 (steps 1603 and 1604), the following operation is repeatedly executed until the number of iterations of the operation becomes to be equal to a value attained by multiplying the number of keywords by the number of blocks of the teaching material. The value of a counter variable counter (j) is set to 0 (step 1605) to set the number k of objective keywords to 0 (step 1606). Moreover, according to the number of the assigned keywords, the following operation is repetitiously executed (1607). When the i-th keyword kw - i is identical to the k-th keyword 303 (FIG. 3) of the j-th block of teaching material ft- j, the counter variable counter (j) is incremented by 1 representing the number of keywords matched for the j-th teaching material (steps 1608 and 1609). For each of the specified keywords kw - 1 to kw - m, the processing is repeatedly achieved for all blocks of the teaching material. After the processing is completed for all keywords, there is determined one of the blocks for which the matched keywords takes the largest value, thereby selecting the block as the objective block of the teaching material. After the objective block is selected, the processing step 803 and subsequent steps are executed to display the data of the teaching material (step 806) and then control is passed to the command reception and execution processing (steps 807 and 808). In this connection, in the processing to select the block of the teaching material most suitable for the requirement of the user, there may be conducted another processing, for example, by assigning a weight to each keyword. In such a case, the basic processing described above can also be employed.

Subsequently, description will be given in detail of a variation of the system configuration implementing the embodiment above.

Figure 20:
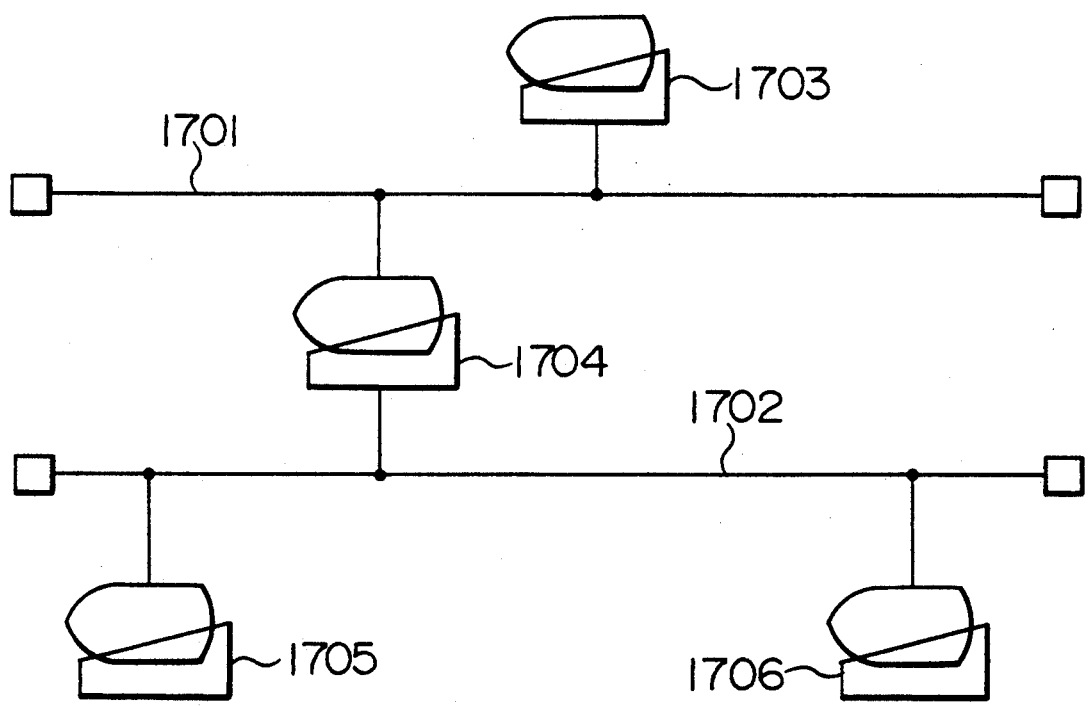
FIG. 20 is a structural diagram showing a computer network in which the computer assisted learning support system is materialized.

FIG. 20 shows the constitution of a computer network including four computers 1703 to 1706 connected via communication lines 1701 and 1702 to each other. In this example, the computer assisted learning support system is collaboratively used by the plural computers on the computer network. In this regard, description of functions such as the mailing function which can be realized by the known network communication technology will be avoided.

Figure 21:
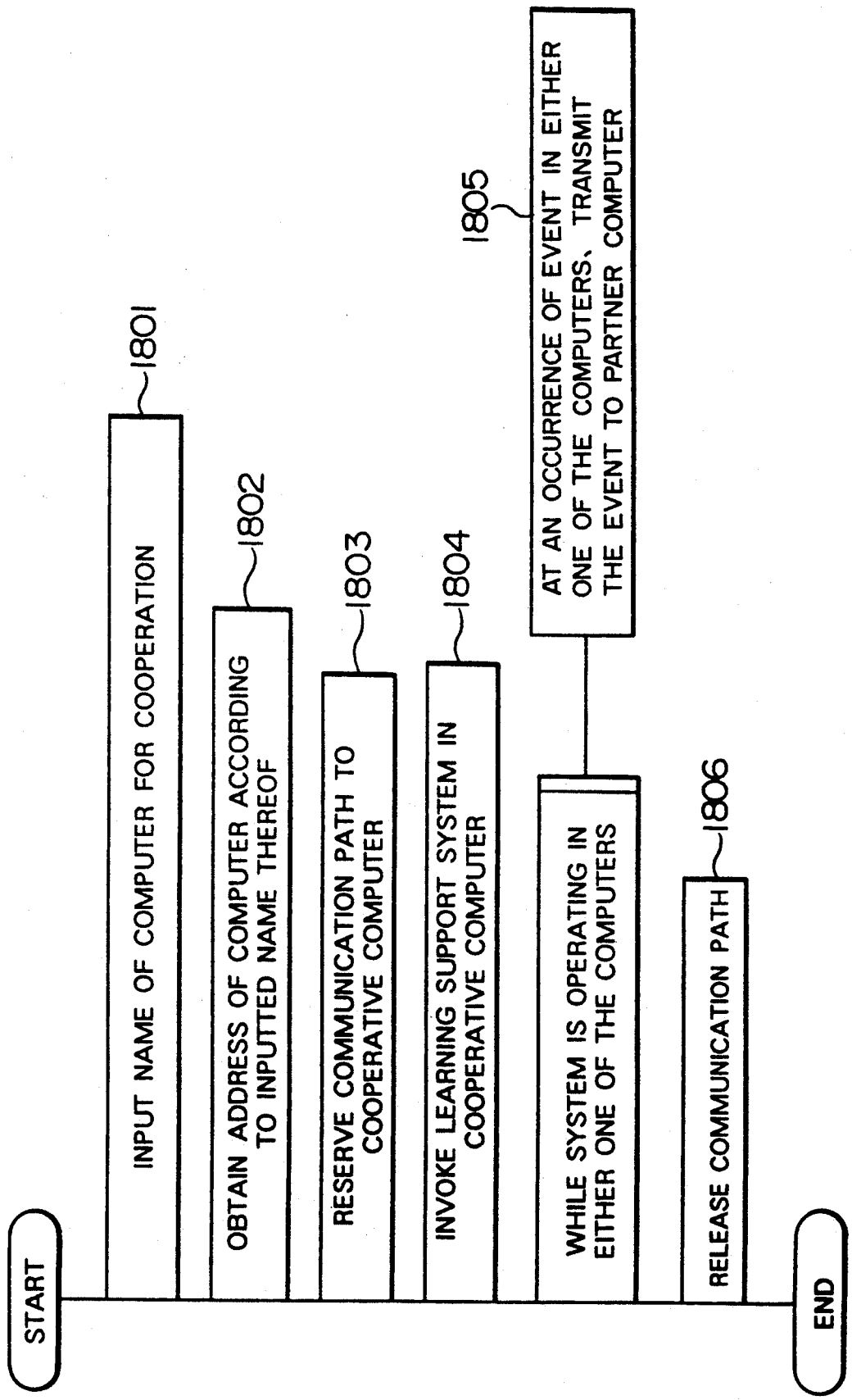
FIG. 21 is a flowchart showing the processing carried out by the computer shown in FIG. 20.

FIG. 21 is a flowchart showing the processing to be executed by each computer in the computer network system of FIG. 20. Each computer has a network control table storing a name and an address of each computer in the network. In a computer in which the learning support system is invoked there are inputted names of other computers for the collaborative operation (step 1801). According to the each of the inputted computer names, an address there of is attained from the network control table (step 1802) to reserve a communication path to the other computers (step 1803). The communication path can transfer commands and data to the communicating computer or program and is implemented by the ordinary network communication technology. Subsequently, a command to invoke the learning support system is sent via the communication path thus reserved to the computer having the address determined in the step 1802 (step 1804). Thereafter, when the learning support system is operating in any other computer, when there occurs an event which may possibly change the display image, for example, when a pointing device is moved, when data is inputted from a keyboard, or when the screen image is refreshed, the pertinent processing is executed in the computer associated with the event. In addition thereto, the event is notified to the partner computer via the communication path. Each computer monitors, when awaiting an occurrence of an event, operations of the pointing device, the keyboard, etc. connected thereto as well as the communication path. Consequently, the operation of the partner computer can be acquired. As a result, there is developed the same operation of the learning support system in both computers. In this regard, each computer takes the following action in order to concurrently monitor the pointing device, the keyboard, etc. connected thereto as well as the communication path. Namely, (a) the computer accepts an interruption corresponding to an occurrence of an event from the input/output device, the communication path, or the like to conduct processing associated with the type of interruption (interruption based action) or (b) the computer periodically monitors an occurrence of an event from the input/output device, the communication path, or the like (action by monitoring a flag in the Round-Robin order; step 1805). In the step 1805, by achieving the processing above, the computer assisted learning support system operating in two computers can be simultaneously controlled. Through the processing above, when either one of the computers terminates the operation of the learning support system, the condition is transmitted to the other computers, thereby terminating the processing of the system in the computers. In this case, the reserved communication path is released before the processing is finished (step 1806).

Figures 22, 24:
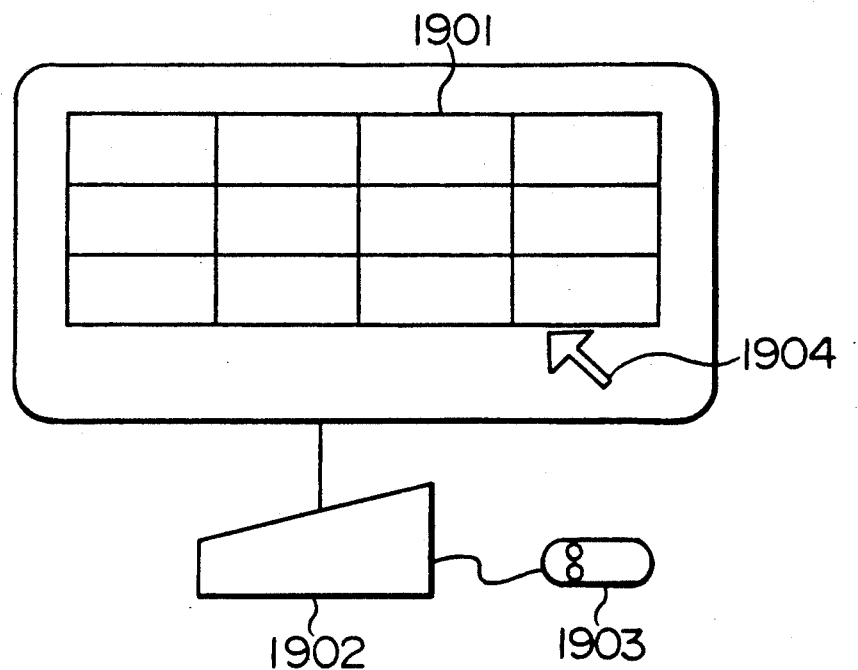
FIG. 22 is a diagram illustratively showing an example of a screen displayed when a plurality of screens are monitored in the system of FIG. 20.
FIG. 24 is a diagram showing the configuration of a user management table.

FIG. 22 shows an example of a screen image displayed on a display connected to each computer in the variation of the embodiment. In this diagram, reference numeral 1901 indicates a minimized screen image of the other computer connected to the network, 1902 denotes an input device such as a keyboard, 1903 designates a pointing device such as a mouse, and 1904 stands for a cursor. In order to realize the minimized display field 1901 related to the other computer, there is employed, for example, a multiwindow system so as to relate one of the multiple windows to the minimized screen image. Moreover, for each identifier of the computer connected to the network, the display position is beforehand determined. When an ordinary window system is viewed from the software, a window seems to be a terminal or a computer. Consequently, when a computer notifies an operation of a terminal thereof to a partner computer, the same screen image can be reproduced on a display of the partner computer.

FIG. 23 shows the constitution of another variation of the computer assisted learning support system. Specifically, reference numerals 2001 to 2008 of FIG. 23 correspond to reference numerals 201 to 208 of FIG. 2 and there is additionally installed an external storage 2009 for storing therein a table to contain user management information. FIG. 24 shows the structure of the user management table in the external storage 2009. Numeral 2101 indicates a field in which a name of the user is written, 2102 is a field in which a pass word assigned to each user is stored, 2103 designates a field for containing the number of blocks of the teaching material already learned by the user, and 2104 denotes a field for storing therein a list of names of the teaching materials already learned by the user.

FIG. 25 is a flowchart of the processing to be executed by the central processor in this variation example. When the system is initiated, there is first displayed a screen image for inputting an identifier of the user (step 2201). When the user inputs the identifier, management information of the user is read, according to the user's identifier, from the user management information storage (step 2202). In this situation, by setting a password, it is also possible to prevent the user not having the authorized usage right from illegally utilizing the management information. Subsequently, the computer assisted learning support system shown in FIG. 8 is invoked to execute processing steps 801 to 808 (step 2203). Thereafter, until the system termination is selected, the following operation is repeatedly conducted. That is, a block of the teaching material is specified (step 2204). In response to a specification of a teaching material, a retrieval is made through the user management information for names of the already-studied teaching materials (field 2104 of the table). If the block of the teaching material specified in the step 220 is found in the names of the already-studied teaching materials 2104, a message is outputted to notify the condition. A teaching material other than the specified teaching material is then presented (step 2205). If the teaching material specified in the step 2004 has not been studied, the specified block of the teaching material is displayed (step 2206). Next, the name of the teaching material specified in the step 2204 is added to the field 2104 of the name of the already-studied teaching material in the user management information (step 2207).

Through the processing above, according to the status of the progress of the user, quite an appropriate teaching material can be presented to the user, thereby improving the learning efficiency. In this connection, in addition to the presentation of the teaching material in the step 2205 of FIG. 25, there may be employed other operations. Namely, (a) the next teaching material is presented, (b) a teaching material associated with a more generalized concept is presented, and (c) an exercise related to the teaching material is presented such that depending on an answer to the exercise, there is determined whether an already-studied teaching material is presented or the next teaching material is presented. In the method (a), the teaching material specified to be subsequent to the material specified in the step 2204 is displayed in the initial screen (FIG. 6) when the system is started. Consequently, it is only necessary to specify the teaching material. As another method of specifying the teaching material, the teaching material can be expressed by the link name 403 of FIG. 4, namely, by a link representing the pertinent relational information. Moreover, according to the method (b), the teaching material related to a wider concept can also be specified by the link information 403 of FIG. 4. Furthermore, as for the method (c), if an exercise is defined as a link for the teaching material and the exercise has not been solved yet, the exercise is presented. If the exercise is missing, the teaching material selected in the method (a) or (b) is presented. In addition, there may be developed various variations by using the link information 403 of FIG. 4, for example, according to the result of the exercise, an already-studied teaching material is presented again if the result is less than or equal to a predetermined score.

As above, according to the present invention, (a) the user can easily retrieve necessary relational information and hence can traverse between the teaching materials, which improves the efficiency of education. In addition, (b) even when the teacher and the student are considerably apart from each other, since the learning support system is controlled for the teacher and the student to exert influences to each other via the common screen images, the teacher can acquire detailed information about the status of progress of the student to conduct a satisfactory education depending on potential of the student.

While particular embodiments of the invention have been shown and described, it will be obvious to those skilled in the art that various changes and modifications may be made without departing from the present invention in its broader aspects.

What is claimed is:

1. A computer assisted learning support system comprising:
   a storage for storing therein blocks of a teaching material respectively assigned with teaching material identifiers and link information which represents by a pair of teaching material identifiers a relationship between blocks of the teaching material, each of the blocks being defined by subdividing the teaching material according to contents thereof;
   a display for presenting, in a change-over manner, a screen image of the blocks of the teaching material and a screen image of contents of the blocks of the teaching material and the link information including the teaching material identifiers respectively assigned to the blocks of the teaching material;
   an input device for inputting therefrom a selection item for one of the blocks of the teaching material presented on said display and a selection item for one of the contents of the blocks of the teaching material and the link information;
   first means, responsive to the selection item from said input device for the block of the teaching material, for reading from said storage the contents of the selected block of the teaching material and the link information including the teaching material identifier of the selected block of the teaching material and for outputting the obtained items to said display; and
   second means, responsive to the selection item from said input device for the link information, for reading from said storage the contents of a different block of the teaching material which has a teaching material identifier not contained in the selected link information and which is not presented on said display and different link information including the teaching material identifier of the different block of the teaching material and for outputting the attained items to said display.

2. A system according to claim 1, wherein:
   said display includes a plurality of display areas under a multiwindow control for displaying a plurality of mutually different blocks of the teaching material respectively in the plurality of display areas; and
   said input device inputs therefrom a selection item for one of the link information in association with one of the plurality of blocks of the teaching material thus displayed in the plurality of display areas.

3. A system according to claim 1, wherein:
   said storage stores therein identifiers of parts of the block of the teaching material respectively assigned to parts of the block of the teaching material, the parts constituting the block of the teaching material, and different link information including a pair of teaching material identifiers of different blocks of the teaching material; and
   said display displays the different link information.

4. A system according to claim 1, wherein:
   said storage stores therein keywords respectively related to the blocks of the teaching material, the keywords representing characteristics respectively of the blocks;
   said input device inputs a character string, and
   said system further including means for retrieving, with the inputted character string set as a key for a retrieval, a keyword stored in said storage and for obtaining therefrom a block of the teaching material associated with a result of the retrieval.

5. A system according to claim 4, further including means for extracting from the inputted character string a partial character string for the retrieval.

6. A system according to claim 1, wherein:
said storage stores therein an identifier of a user of said system and a teaching material identifier of the block of the teaching material already used by the user with a correspondence established therebetween;
said first output means references a correspondence relationship between the user's identifier and the teaching material identifier of the block of the teaching material and outputs to said display, when the selection of the block of the teaching material from said input device is related to a block of the teaching material already used by the user, a notification that the selected block of the teaching material is a block of the teaching material already used by the user.

7. A computer assisted learning support system in which a plurality of computers achieve a collaborative operation, wherein:
one of the plural computers comprises:
a storage for storing therein blocks of a teaching material respectively assigned with teaching material identifiers and link information which represents by a pair of teaching material identifiers a relationship between blocks of the teaching material, each of the blocks being defined by subdividing the teaching material according to contents thereof;
a display for presenting, in a change-over manner, a screen image of the blocks of the teaching material and a screen image of contents of the blocks of the teaching material and the link information including the teaching material identifiers respectively assigned to the blocks of the teaching materials;
an input device for inputting therefrom a selection item for one of the blocks of the teaching material presented on said display and a selection item for one of the contents of the blocks of the teaching material and the link information;
output means, responsive to the selection item from said input device for the block of the teaching material, for reading from said storage the contents of the selected block of the teaching material and the ink information including the teaching material identifier of the selected block of the teaching material to output the read block contents and link information to said display;
means, responsive to the selection item from said input device for the link information, for reading from said storage, the contents of a different block of the teaching material which has a teaching material identifier not contained in the selected link information and which is not presented on said display and different link information including the teaching material identifier of the different block of the teaching material to output the read different block contents and different link information to said display; and
means for transferring information from said input device to the computers other than said one computer; and
each of the other computers comprises:
means for receiving information transferred from said one computer;
a storage for storing therein blocks of a teaching material respectively assigned with teaching material identifiers and link information which represents by a pair of teaching material identifiers a relationship between blocks of the teaching material, each of the blocks being defined by subdividing the teaching material according to contents thereof;
a display for presenting, in a change-over manner, a screen image of the blocks of the teaching material and a screen image of the contents of the blocks of the teaching material and the link information including the teaching material identifiers respectively assigned to the blocks of the teaching materials;
an input device for inputting therefrom a selection item for one of the blocks of the teaching material presented on said display and a selection item for one of the contents of the blocks of the teaching material and the link information;
means, responsive to the selection item from either one of said input device and said receiving device for the block of the teaching material, for reading from said storage the contents of the selected block of the teaching material and the link information including the teaching material identifier of the selected block of the teaching material to output read selected block contents and link information to said display; and
means, responsive to the selection item from either one of said input device and said receiving means for the link information, for reading from said storage the contents of a different block of the teaching material which has a teaching material identifier not contained in the selected link information and which is not presented on said display and different link information including the teaching material identifier of the different block of the teaching material to output the read different block contents and different link information to said display.

8. A processing method for use in a computer assisted learning support system having a storage storing therein blocks of a teaching material respectively assigned with teaching material identifiers and link information which represents by a pair of teaching material identifiers a relationship between blocks of the teaching material, each of the blocks being defined by subdividing the teaching material according to contents thereof, comprising the steps of:
displaying on a display the blocks of the teaching material stored in the storage;
inputting from an input device a selection item for one of the blocks of the teaching material displayed on said display;
reading from said storage, in response to the selection item from the input device for the block of the teaching material, contents of the selected block of the teaching material and the link information including the teaching material identifier of the selected block of the teaching material and outputting the read items on said display;
inputting a selection item for one of the link information in response to the presentation on the display of the contents of the block of the teaching material and the link information; and
reading from the storage, in response to the selection item from the input device for the link information, the contents of a different block of the teaching material which has a teaching material identifier not contained in the selected link information and which is not presented on the display and different link information including the teaching material identifier of the different block of the teaching material and displaying the read items on said display.

9. A method according to claim 8, further including the steps of:
providing a plurality of display areas in the display under a multiwindow control;
displaying a plurality of mutually different blocks of the teaching material respectively in the plurality of display areas; and
inputting a selection item for one of the link information in association with one of the plurality of blocks of the teaching material thus displayed in the plurality of display areas.

10. A method according to claim 8, further including the steps of:
storing in the storage identifiers of parts of the block of the teaching material respectively assigned to parts of the block of the teaching material constituting the block of the teaching material and different link information including a pair of teaching material identifiers of different blocks of the teaching material; and
displaying further the different link information in association with the display of the blocks of the teaching material.

11. A method according to claim 8, further comprising the steps of:
storing in the storage keywords respectively related to the blocks of the teaching material, the keywords representing characteristics respectively of the blocks;
inputting from the input device a character string;
retrieving, with the inputted character string set as a key for a retrieval, a keyword stored in the storage; and
obtaining from the storage a block of the teaching material associated with a result of the retrieval.

12. A method according to claim 11, further including the step of extracting from the inputted character string a partial character string for the retrieval.

13. A method according to claim 8, further including the steps of:
storing in the storage an identifier of a user of the system and a teaching material identifier of the block of the teaching material already used by the user with a correspondence established therebetween; and
referencing a correspondence relationship between the user's identifier and the teaching material identifier of the block of the teaching material and presenting on said display, when the selection of the block of the teaching material from the input device is related to a block of the teaching material already used by the user, a notification that the selected block of the teaching material is a block of the teaching material already used by the user.

* * * * *